(12) United States Patent
Nigro

(10) Patent No.: US 7,603,944 B2
(45) Date of Patent: Oct. 20, 2009

(54) PISTON ASSEMBLY AND WRIST PIN THEREFOR PROVIDING A METHOD OF CONTROLLING ROTATION OF THE WRIST PIN WITHIN CORRESPONDING PISTON PIN BORES AND CONNECTING ROD WRIST PIN BORE

(75) Inventor: Roberto Bueno Nigro, Ann Arbor, MI (US)

(73) Assignee: Federal-Mogul World Wide, Inc., Southfield, MI (US)

( * ) Notice: Subject to any disclaimer, the term of this patent is extended or adjusted under 35 U.S.C. 154(b) by 258 days.

(21) Appl. No.: 11/696,278

(22) Filed: Apr. 4, 2007

(65) Prior Publication Data

US 2008/0245230 A1 Oct. 9, 2008

(51) Int. Cl.
*F02F 3/22* (2006.01)
*F01P 3/10* (2006.01)

(52) U.S. Cl. ............................................. 92/187
(58) Field of Classification Search ................ 92/187
See application file for complete search history.

(56) References Cited

U.S. PATENT DOCUMENTS

| | | | |
|---|---|---|---|
| 1,466,756 A | 9/1923 | Rich | |
| 1,769,474 A | 7/1930 | Svenson | |
| 1,772,187 A | 8/1930 | Manning | |
| 1,909,553 A | 5/1933 | Schermer et al. | |
| 1,936,158 A | 11/1933 | Dyer | |
| 1,939,959 A | 12/1933 | Dick | |
| 2,049,411 A | 8/1936 | Abbe | |
| 2,059,713 A | 11/1936 | Schneider | |
| 2,687,931 A | 8/1954 | Flynn, Jr. | |
| 2,703,264 A | 3/1955 | Pitner | |
| 2,797,135 A | 6/1957 | Johansson | |
| 2,851,319 A | 9/1958 | Pitner | |
| 3,479,929 A | 11/1969 | Fangman | |
| 4,359,913 A | 11/1982 | Mahlke | |
| 4,677,722 A | 7/1987 | Emmer | |
| 4,712,941 A | 12/1987 | Emmer | |
| 4,756,240 A | 7/1988 | Mielke | |
| 5,027,996 A | 7/1991 | Fefeu et al. | |
| 5,070,743 A | 12/1991 | Simon | |

(Continued)

FOREIGN PATENT DOCUMENTS

DE 3527417 A1 2/1987

(Continued)

*Primary Examiner*—Thomas E Lazo
(74) *Attorney, Agent, or Firm*—Robert L. Stearns; Dickinson Wright PLLC

(57) ABSTRACT

A piston assembly and wrist pin therefor provide a method for controlling rotation of the wrist pin with respective piston pin bores and connecting rod small end wrist pin bore. The wrist pin has a cylindrical body with opposite end portions spaced axially from one another by a central portion and a through bore of varying internal diameter. The through bore has first diameter and second diameters, wherein the first diameter is less than the second diameter. The first diameter is defined in one of the central portion or the opposite end portions, while the second diameter is defined in the other of the central portion or the opposite end portions. The first diameter transitions to the second diameter generally between the small end of the connecting rod and the pin bores of the piston.

15 Claims, 2 Drawing Sheets

U.S. PATENT DOCUMENTS

| | | | |
|---|---|---|---|
| 5,114,262 A | 5/1992 | Kojima | |
| 5,289,758 A | 3/1994 | Berlinger | |
| 5,628,577 A * | 5/1997 | Ribeiro et al. | 92/187 |
| 6,038,943 A * | 3/2000 | Vogelsang | 92/190 |
| 6,520,069 B2 | 2/2003 | Kennedy et al. | |

FOREIGN PATENT DOCUMENTS

| | | |
|---|---|---|
| JP | 63243570 A | 10/1988 |
| JP | 02-283964 | 11/1990 |
| JP | 06-043246 U | 6/1994 |
| JP | 12182830 A | 7/2001 |

\* cited by examiner

PISTON ASSEMBLY AND WRIST PIN THEREFOR PROVIDING A METHOD OF CONTROLLING ROTATION OF THE WRIST PIN WITHIN CORRESPONDING PISTON PIN BORES AND CONNECTING ROD WRIST PIN BORE

BACKGROUND OF THE INVENTION

1. Technical Field

This invention relates generally to piston assemblies for internal combustion engines, and more particularly to wrist pins within the assemblies.

2. Related Art

Conventional piston assemblies for use in internal combustion engines generally comprise a crown or head portion which provides a reaction surface for the combustion in a corresponding cylinder of the engine. A pair of laterally spaced pin bosses depend from the piston head and terminate in a pair of coaxial pin bores. A small end of a connecting rod is journaled about a wrist pin, and the wrist pin is journaled within the pin bores.

Typically, bushings are pressed into the pin bores and the small end of the connecting rod to provide a low friction running surface which reduces wear between the wrist pin and the journaled surfaces. However, the incorporation of bushings adds cost and complexity to the construction and manufacture of piston assemblies. As such, it has been discovered to replace the bushings in at least one of the small end of the connecting rod or the pin bores with a low-friction coating, such as disclosed in U.S. Pat. No. 7,024,981, assigned to Federal-Mogul World Wide, Inc., applicant's assignee herein. Further, it is known to incorporate hollowed wrist pins within the piston assembly to reduce weight, improve overall running performance, and extend the useful life of the assembly by reducing loads generated in use. Unfortunately, hollowed wrist pins can come with potentially adverse affects, given they are subject to increased expansion and distortion in use, due primarily to their reduced wall thickness and the affects of heat generated thereon.

SUMMARY OF THE INVENTION

A wrist pin, for operably attaching a small end of a connecting rod to axially aligned pin bores of a piston, constructed in accordance with the invention includes a cylindrical body having a through bore. The through bore has a first diameter and a second diameter, wherein the first diameter is less than the second diameter. The cylindrical body has opposite end portions spaced axially from one another by a central portion. The first diameter is defined in one of the central portion or the opposite end portions, while the second diameter is defined in the other of the central portion or the opposite end portions. The first diameter transitions to the second diameter generally between the small end of the connecting rod and the pin bores of the piston.

Another aspect of the invention includes a piston assembly having a piston crown with pin bosses depending therefrom, wherein the pin bosses have axially aligned pin bores. The assembly further includes a connecting rod having a small end with a bore and a wrist pin having a cylindrical body with a through bore. The through bore has a first diameter arranged for receipt in one of the connecting rod small end bore or the pin bores and a second diameter arranged for receipt in the other of the connecting rod small end bore or the pin bores. The first diameter is less than the second diameter, with the first diameter transitioning to the second diameter generally between the small end of the connecting rod and the pin bores of the piston.

Yet another aspect of the invention includes a method of controlling the rotation of a wrist pin within pin bores of a piston and a wrist pin bore of a small end of a connecting rod by providing controlled expansion of the wrist pin in use. The method includes providing a cylindrical body having opposite end portions spaced axially from one another by a central portion, and forming a through bore in the body having a first diameter and a second diameter. The first diameter is defined in one of the central portion or the opposite end portions and the second diameter is defined in the other of the central portion or the opposite end portions, with the first diameter being less than the second diameter. Further, forming a pair of transitions between the first diameter and the second diameter so that the transitions are located generally between the small end of the connecting rod and the pin bores of the piston. Accordingly, either the central portion or the end portions have a reduced internal diameter, and thus, the degree of expansion in use is different between the differing wall thickness provided. As such, depending on the application, the central portion or the outer portions can be caused to expand more than the other, thereby providing a mechanism in which to control the rotation of the wrist pin with the respective pin bores of the piston and wrist pin bore of the connecting rod.

BRIEF DESCRIPTION OF THE DRAWINGS

These and other aspects, features and advantages of the invention will become readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
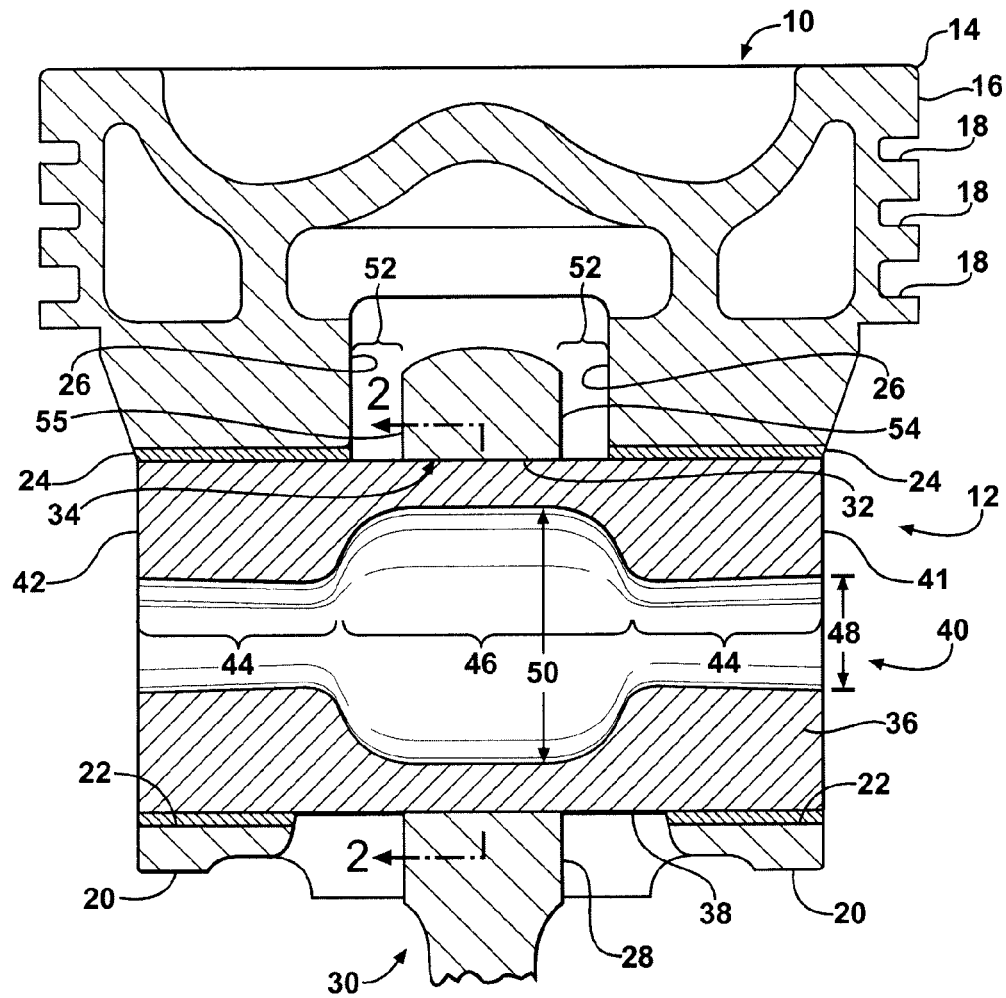
FIG. 1 is a cross-sectional view of a piston assembly with a wrist pin constructed according to one presently preferred embodiment of the invention.
Figure 2:
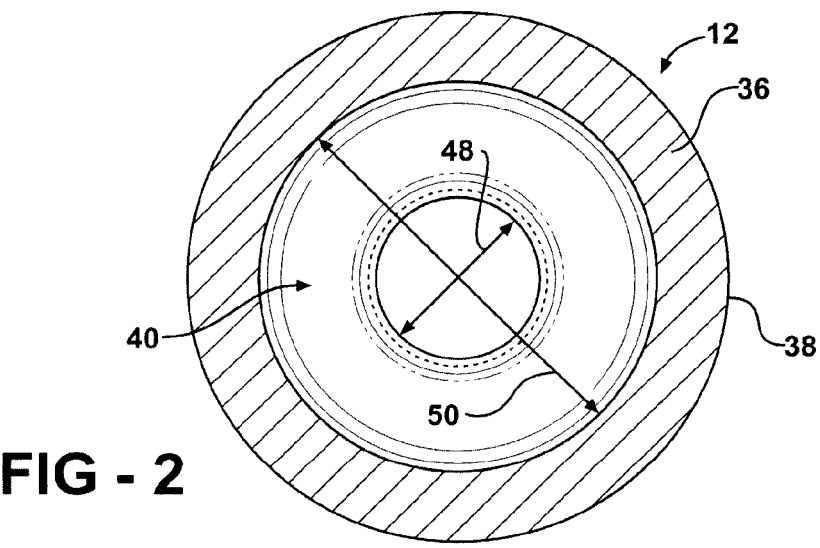
FIG. 2 is a cross-sectional view of the wrist pin taken generally along line 2-2 of FIG. 1.

Referring in more detail to the drawings, FIG. 1 illustrates piston assembly 10 and wrist pin 12 constructed according to one presently preferred embodiment of the invention. The piston assembly 10 has a piston body 14, either cast or forged, having an upper crown portion 16 formed with ring grooves 18 to accommodate one or more rings (not shown). A pair of pin bosses 20 depend from the upper crown portion 16 and terminate in axially aligned pin bores 22. The pin bores 22 are represented as having separately manufactured bearing liners or bushings 24 inserted therein to reduce the running friction between the pin bores 22 and the wrist pin 12 in use. The pin bosses 20 have inner faces 26 laterally spaced from one another a distance sufficient to receive a small end 28 of a connecting rod 30 therebetween. The connecting rod 30 is preferably cast or forged from steel. The small end 28 has a wrist pin bore 32, preferably having a ground running surface 34, sized for close receipt of the wrist pin 12 therethrough. The running surface 34 may be coated as a bushingless running surface, such as with manganese phosphate, for example, a generally soft antifriction material in comparison to that of the bushings 24. Accordingly, the wrist pin bore 32 preferably remains bushingless to improve the ease of manufacturability and reduce cost.

With the wrist pin bore 32 being bushingless, it is inherently subject to increased wear from running friction in comparison to the accompanying piston pin bores 22 that have bushings 24. This is particularly true given that any coatings used in the wrist pin bore 32 are typically relatively soft. As such, to avoid increased relative wear within the wrist pin bore 32, the wrist pin 12 is constructed, preferably as a monolithic piece of material, to facilitate relative rotation or oscillation within the piston pin bores 22 with reduced relative movement occurring within the connecting rod wrist pin bore 32.

To achieve the above stated difference in relative dynamic movement, the wrist pin 12 has a body 36 with a cylindrical outer surface 38 and a through bore 40 of varying internal diameter extending between opposite ends 41, 42 of the wrist pin 12. The specific geometry of the internal diameter of the body 36 provides a method of controlling the rotation of the wrist pin 12 within the piston pin bores 22 and the wrist pin bore 32 of the connecting rod 30. The cylindrical body 38 has opposite end portions 44 spaced axially from one another by a central portion 46. The through bore configurations in the end portions 44 are geometrically mirrored to one another, and have a first diameter 48, while the through bore 40 in the central portion 46 has a second diameter 50, wherein the first diameter 48 is substantially less than the second diameter 50. It should be recognized that the difference between the first and second diameters 48, 50 can vary from application to application, though it is anticipated that a difference between about 30-60 percent in diameter between the two will provide desired results, and more preferably between about 40-50 percent difference. It should also be recognized, as shown in the drawing, that the first and second diameters 48, 50 need not extend as constant diameters across the respective central and end portions 44, 46, but that they can have a generally subtle and smooth variation across their respective zones. The first diameter 48 of each of the end portions 44 transitions to the second diameter 50 of the central portion 46 within relatively narrow spaces 52 defined between opposite sides 54, 55 of the small end 28 of the connecting rod 30 and the inner faces 26 of the pin bosses 20. Accordingly, the cylindrical body 36 has a substantially decreased wall thickness within the central portion 46 compared to that of the end portions 44, with the difference in wall thicknesses changing suddenly, preferably without sharp corners, with the magnitude of change depending ultimately on the chosen percentage in bore differences within the ranges set forth above.

In use, due to the decreased wall thickness of the central portion 46 relative to the end portions 44, the central portion 46 experiences greater expansion and change in shape in response to heat generated in use, such that the central portion 46 takes on a greater out-of-round geometry than the adjacent end portions 44. As such, the outer surface 38 of the wrist pin 12 over the central portion 46 has an increased oval shape in comparison to that of the outer surface 38 over the end portions 44, which tend to remain round. Accordingly, the outer surface 38 over each end portion 44 is able to rotate or oscillate freely within the bushings 24 of the pin bores 22, while the outer surface 38 over the central portion 46 is brought into increased frictional contact with the wrist pin bore 32 of the connecting rod 30. With the increased friction resulting between the wrist pin 12 and the wrist pin bore 32, the wrist pin 12 is inhibited from rotation or oscillation in the wrist pin bore 32, and thus, less scuffing and wear in general results to the bushingless wrist pin bore 32, while at the same time, the wrist pin 12 is generally encouraged to rotate freely within the bushings 24 in the pin bores 22.

Figure 3:
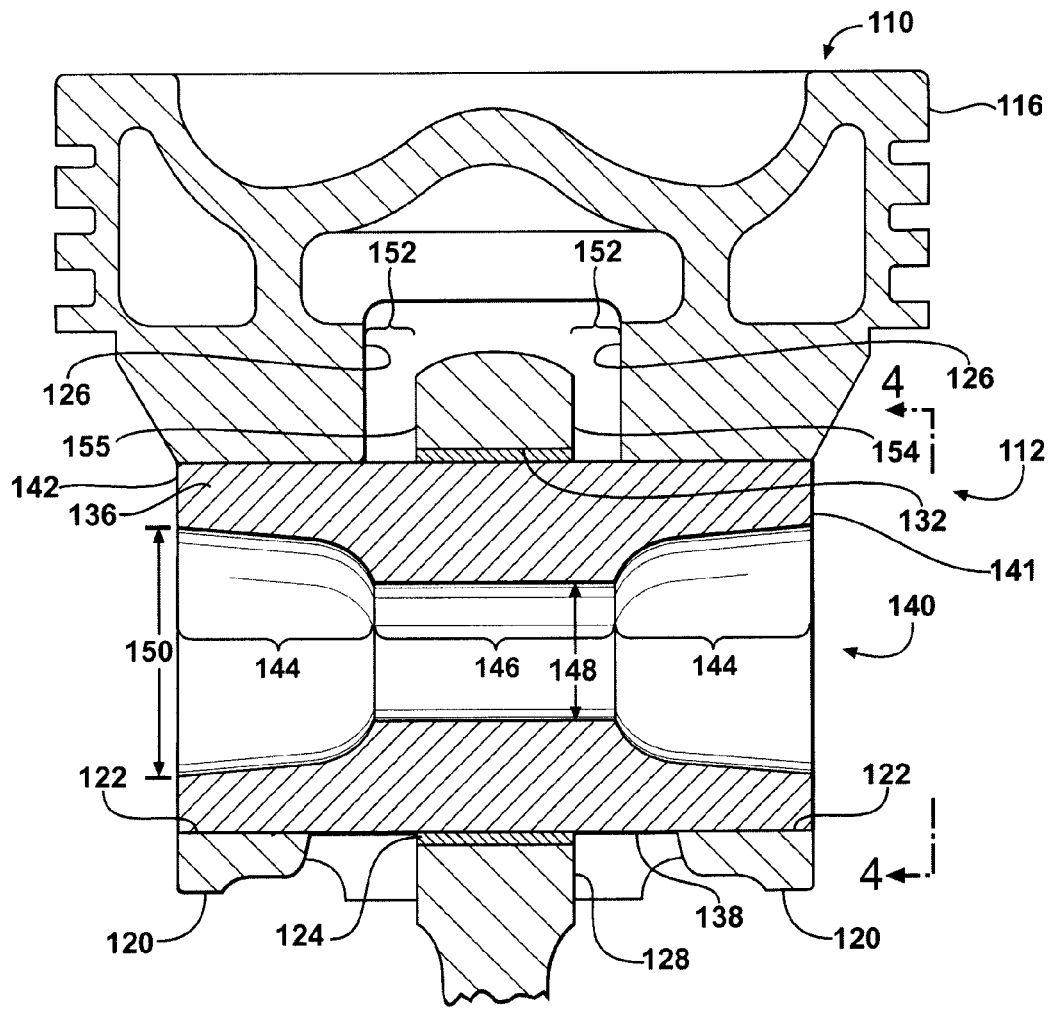
FIG. 3 is cross-sectional view of a piston assembly with a wrist pin constructed according to another presently preferred embodiment of the invention.
Figure 4:
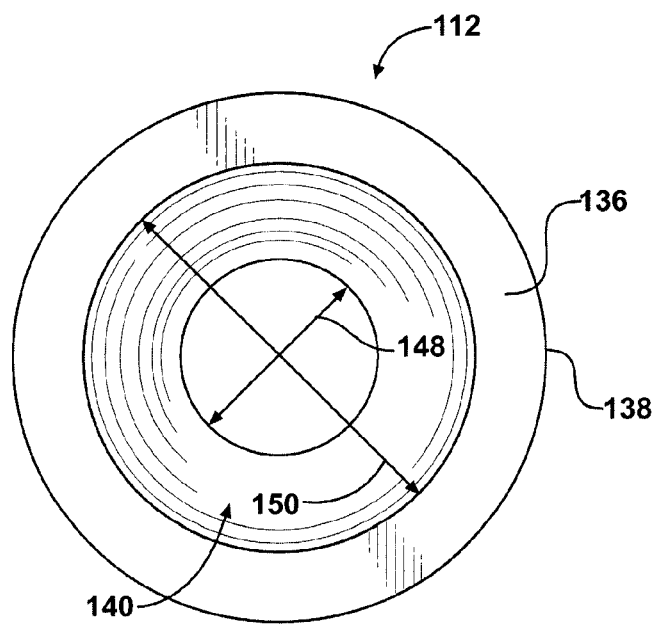
FIG. 4 is view looking generally along the line 4-4 of FIG. 3.

A piston assembly 110 having a wrist pin 112 constructed according to another presently preferred embodiment of the invention is illustrated in FIGS. 3 and 4, wherein the same reference numerals as above, offset by 100, are used to identify similar features.

The piston assembly 110 has an upper crown portion 116 with pin bosses 120 depending therefrom to axially aligned pin bores 122. The pin bores 122, unlike in the previous embodiment, are bushingless to improve the ease of manufacturability and reduce cost. The pin bores 122 may be coated as a bushingless running surface, such as with manganese phosphate, for example.

The wrist pin 112 has a body 136 with a cylindrical outer surface 138 and a through bore 140 of varying internal diameter extending between opposite ends 141, 142. The cylindrical body 138 has opposite end portions 144 spaced axially from one another by a central portion 146. The through bore configurations in the end portions 144 are geometrically mirrored to one another, and have a second diameter 150, while the through bore 140 in the central portion 146 has a first diameter 148, wherein the first diameter 148 is less than the second diameter 150. As in the embodiment above, it should be recognized that the difference between the first and second diameters 148, 150 can vary from application to application, though it is anticipated that a difference between about 30-60 percent in diameter between the two will provide optimal results, and more preferably between about 40-50 percent difference. It should also be recognized, as shown in the drawing, that the first and second diameters 148, 150 need not extend as constant diameters across the respective central and end portions 144, 146, but that they can have a generally subtle and smooth variation across their respective zones. As above, the first diameter 148 transitions to the second diameters 150 generally within spaces 152 defined between opposite sides 154, 155 of the small end 128 of the connecting rod 130 and the inner faces 126 of the pin bosses 120. Accordingly, the cylindrical body 136 has a substantially increased wall thickness within the central portion 146 compared to that of the end portions 144, with the difference in wall thicknesses depending ultimately on the chosen bore differences within the ranges set forth above.

In use, due to the decreased wall thicknesses of the end portions 144 relative to the central portion 146, the end portions 144 experiences greater expansion and change in shape in response to heat generated in use. Accordingly, the end portions 144 take on a greater out-of-round geometry than the central portion 146. As such, the outer surface 138 of the wrist pin 112 over the end portions 144 have an increased oval shape in comparison to that of the outer surface 138 over the central portion 146, which tends to remain round. Accordingly, the outer surface 138 over the central portion 146 is able to rotate or oscillate freely within the bushing 124 in the connecting rod wrist pin bore 132, while the outer surface 138 over the end portions 144 is brought into increased frictional contact with the piston pin bores 122. With the increased friction resulting between the wrist pin 112 and the pin bores 122, the wrist pin 112 is inhibited from rotation or oscillation in the pin bores 122, and thus, less scuffing and wear in general results to the bushingless pin bores 122, while at the same time, the wrist pin 112 is generally encouraged to rotate freely within the bushing 124 in the wrist pin bore 132.

Obviously, many modifications and variations of the present invention are possible in light of the above teachings.

It is, therefore, to be understood that within the scope of the appended claims, the invention may be practiced otherwise than as specifically described.

What is claimed is:

1. A wrist pin for operably attaching a small end of a connecting rod to axially aligned pin bores of piston, comprising:
   a cylindrical body having a through bore, said through bore having a first diameter and a second diameter, said first diameter being less that said second diameter; and
   wherein said cylindrical body has opposite end portions spaced axially from one another by a central portion, said first diameter being defined in one of said central portion or said opposite end portions and said second diameter being defined in the other of said central portion or said opposite end portions, said first diameter transitioning to said second diameter generally between the small end of the connecting rod and the pin bores of the piston, said first diameter if defined in said opposite end portions and said second diameter is defined in said central portion.

2. The wrist pin of claim 1 wherein said wrist pin is a monolithic piece of material.

3. The wrist pin of claim 1 wherein said first diameter is substantially different from said second diameter.

4. The wrist pin of claim 3 wherein said first diameter and said second diameter are spaced axially from one another by sudden change in diameter.

5. The wrist pin of claim 1 wherein said first diameter is about 30-60 percent smaller than said second diameter.

6. A piston assembly, comprising:
   a piston crown with pin bosses depending therefrom, said pin bosses having axially aligned pin bores;
   connecting rod having a small end with a bore; and
   a wrist pin having a cylindrical body with a through bore, said through bore having a first diameter arranged for receipt in one of said connecting rod bore or said pin bores and a second diameter arranged for receipt in the other of said connecting rod bore or said pin bores, said first diameter being less than said second diameter, said first diameter transitioning to said second diameter generally between the small end of the connecting rod and the pin bores of the piston, wherein said first diameter is substantially different from said second diameter.

7. The piston assembly of claim 6 wherein said first diameter is arranged for receipt in said connecting rod bore and said second diameter is arranged for receipt in said pin bores.

8. The piston assembly of claim 7 wherein said wrist pin is a monolithic piece of material.

9. The piston assembly of claim 7 further comprising a bushing disposed in said connecting rod bore and wherein said pin bores are bushingless.

10. The piston assembly of claim 6 wherein said first diameter and said second diameter are spaced axially from one another by a sudden change in diameter.

11. The wrist pin of claim 6 wherein the first diameter is about 30-60 percent smaller than said second diameter.

12. A piston assembly, comprising:
   a piston crown with pin bosses depending therefrom, said pin bosses having axially aligned pin bores;
   a connecting rod having a small end with a bore;
   a wrist pin having a cylindrical body with a through bore, said through bore having a first diameter arranged for receipt in one of said connecting rod bore or said pin bores and a second diameter arranged for receipt in the other of said connecting rod bore or said pin bores, said first diameter being less than said second diameter, said first diameter transitioning to said second diameter generally between the small end of the connecting rod and the pin bores of the piston, wherein said first diameter is arranged for receipt in said pin bores and said second diameter is arranged for receipt in said connecting rod bore.

13. The piston assembly of claim 12 wherein said wrist pin is a monolithic piece of material.

14. The piston assembly of claim 12 further comprising a bushing disposed in each of said pin bores and wherein said connecting rod bore is bushingless.

15. A method of controlling the rotation of a wrist pin within pin bores of a piston and a wrist pin bore of a small end of a connecting rod by providing controlled expansion of the wrist pin in use, comprising:
   providing a cylindrical body having opposite end portions spaced axially from one another by a central portion;
   forming a through bore in said body having a first diameter defined in one of said central portion or said opposite end portions and a second diameter defined in the other of said central portion or said opposite end portions, with said first diameter being about 30-60 percent less than said second diameter; and
   forming a pair of transitions between said first diameter and said second diameter so that the transitions are located generally between the small end of the connecting rod and the pin bores of the piston.

* * * * *